(12) United States Patent
Jarvis

(10) Patent No.: US 8,360,460 B1
(45) Date of Patent: Jan. 29, 2013

(54) FLOATING HITCHING SYSTEM

(76) Inventor: Charles Dwight Jarvis, Jonesboro, GA (US)

( * ) Notice: Subject to any disclaimer, the term of this patent is extended or adjusted under 35 U.S.C. 154(b) by 0 days.

(21) Appl. No.: 13/541,654

(22) Filed: Jul. 3, 2012

(51) Int. Cl.
*B60D 1/02* (2006.01)
(52) U.S. Cl. ........................................ 280/515
(58) Field of Classification Search ............. 280/515
See application file for complete search history.

(56) References Cited

U.S. PATENT DOCUMENTS

| | | | | |
|---|---|---|---|---|
| 2,441,430 A * | 5/1948 | McCullar | ..................... | 56/218 |
| 2,476,511 A * | 7/1949 | Ruth | ..................... | 280/515 |
| 2,478,736 A * | 8/1949 | Balzen | ..................... | 280/477 |
| 2,525,471 A * | 10/1950 | Balzer | ..................... | 280/508 |
| 3,046,037 A * | 7/1962 | Cain | ..................... | 280/477 |
| 3,190,677 A * | 6/1965 | Robbins | ..................... | 280/515 |
| 4,298,212 A * | 11/1981 | Jamison | ..................... | 280/515 |
| 7,398,987 B2 * | 7/2008 | Roe et al. | ..................... | 280/515 |
| 2005/0184484 A1 * | 8/2005 | Johns et al. | ..................... | 280/515 |
| 2009/0096189 A1 * | 4/2009 | Merten et al. | ..................... | 280/515 |

* cited by examiner

*Primary Examiner* — Tony Winner
(74) *Attorney, Agent, or Firm* — Charlena Thorpe, Esq.; The Law Office of Charlena Thorpe, Inc.

(57) ABSTRACT

The apparatuses and methods disclosed herein may be easier and quicker than prior art systems. Furthermore, the apparatuses and method disclosed herein may be more effective over rough terrain. The apparatuses and methods disclosed herein include a tongue attached to the conveyance, a floating hitch attached to the motor vehicle, and a compression-hitching pin. A conveyance can be hitched to a motor vehicle simply by inserting the hitching pin through the tongue of the conveyance and the floating hitch of the motor vehicle and then pushing down on the handle of the hitching pin and turning the handle to lock the hitching pin in place.

7 Claims, 5 Drawing Sheets

FLOATING HITCHING SYSTEM

TECHNICAL FIELD

This disclosure relates to a floating hitching system.

BACKGROUND

Referring to FIG. 1, the standard hitching system 100 for attaching, for example, a trailer 110 to a motor vehicle 120 comprises a tongue 130 attached to the trailer, a tow bar 140 attached to the motor vehicle, a hitching pin 150, and a locking pin 160. The trailer tongue 130 includes a top portion 132a, a bottom portion 132b, and an opening 135 between the top portion 132a and the bottom portion 132b. The opening 135 typical has a height of 2 inches.

Hitching a trailer to a motor vehicle using the standard hitching system 110 can be difficult and time consuming. For example, to hitch the trailer 110 to the motor vehicle 120 using the standard hitching system 100 requires an operator to first align the trailer tongue 130 and the tow bar 140 by positioning the tow bar 140 between the top portion 132a and a bottom portion 132b of the trailer tongue 130 (i.e., by positioning the tow bar 140 in the opening 135 of the trailer tongue 130) and aligning the holes 137 of the trailer tongue 130 (the bottom hole is not shown) and hole 145 of the tow bar 140. Then, the operator must bend down to the trailer tongue 130, which is very close to the ground level, to insert the hitching pin 150 through the holes 137 and 145.

Once the hitching pin 150 is inserted, the operator must then bend down even further to insert the locking pin 160 into a small hole 155 of the hitching pin 150. Since the operator cannot see the hole 155, to insert the locking pin 160 into the small hole 155, the operator must feel for the hole and then turn the hitching pin 150 so that the hole is positioned to insert the locking pin 160 into the hole 140, again by feel.

Physically bending down to insert the hitching pin 150 and the locking pin 160 can be difficult and problematic for people with physical impairments (e.g., arthritis in the knees). The tasks involved in hitching a trailer to a motor vehicle using the standard hitching system require good coordination, flexibility, and eyesight.

However, one of the main design deficiencies of the standard hitching system can be the limited vertical motion that the standard hitching system provides for the front-end of a towed cart-like vehicle. For example, the vertical motion of the front-end of the trailer is limited to the vertical length of the opening 135. This limited vertical motion can be problematic when a towed cart-like vehicle with one or two front wheels encounters an elevation such as a low stump or curb. Typically, the front wheels will be either damaged or torn off the vehicle when the vehicle attempts to traverse the elevation.

DETAILED DESCRIPTION

Various implementations of this disclosure provide apparatuses and methods for attaching a conveyance to a motor vehicle. The apparatuses and methods disclosed herein may be easier and quicker to operate than prior art systems. Furthermore, the apparatuses and method disclosed herein may be more effective over rough terrain, especially for a front-wheeled conveyance. The apparatuses and methods disclosed herein include a tongue attached to the conveyance, a floating hitch attached to the motor vehicle, and a compression-hitching pin. A conveyance can be hitched to a motor vehicle simply by inserting the hitching pin through the tongue of the conveyance and the floating hitch of the motor vehicle and then pushing down on the handle of the hitching pin and turning the handle to lock it in place. In some implementations, the tongue can be attached to the motor vehicle and the floating hitch can be attached to the conveyance.

Figure 1:
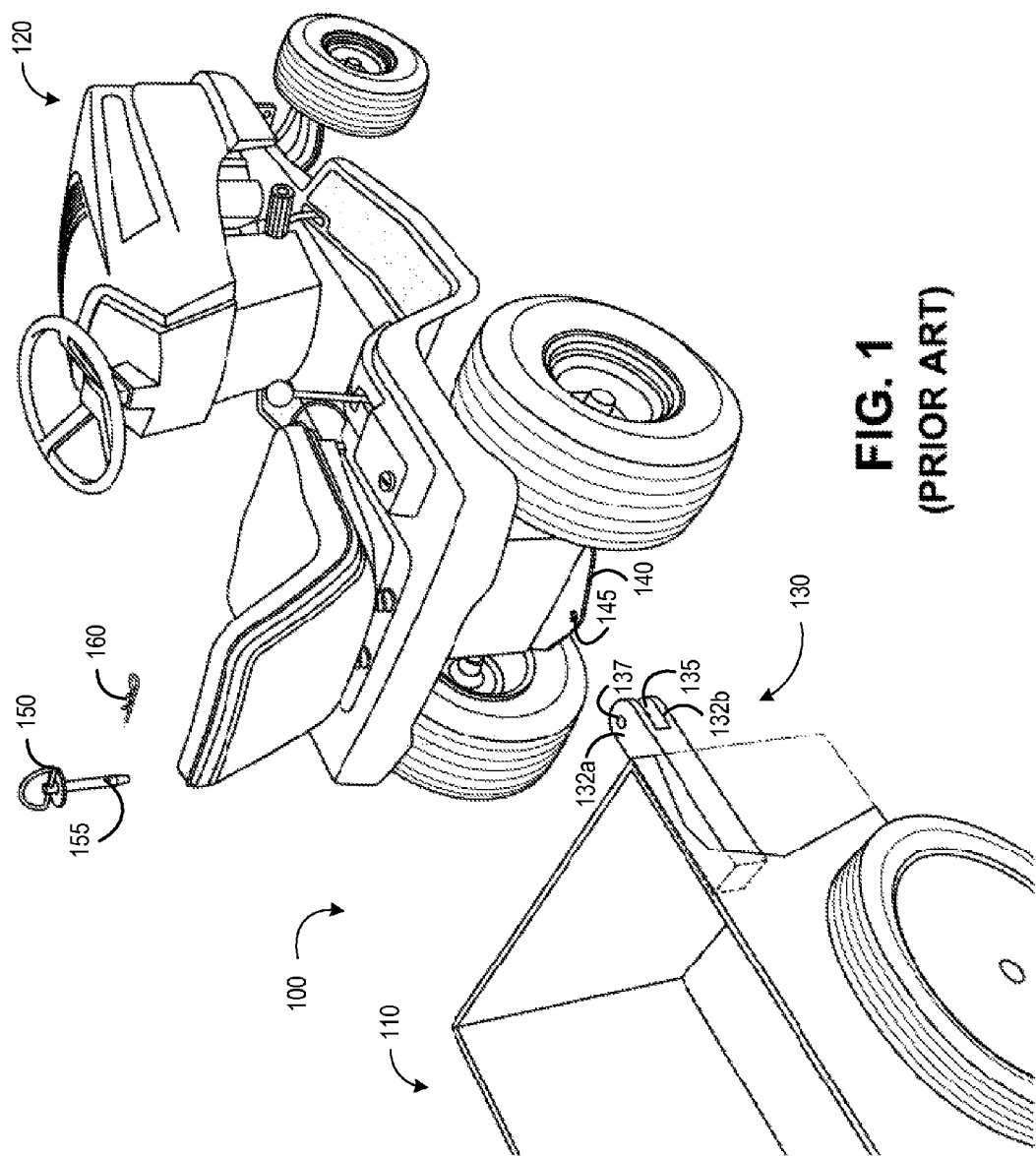
FIG. 1 illustrates a standard hitching system for attaching a trailer to a motor vehicle.
Figure 2:
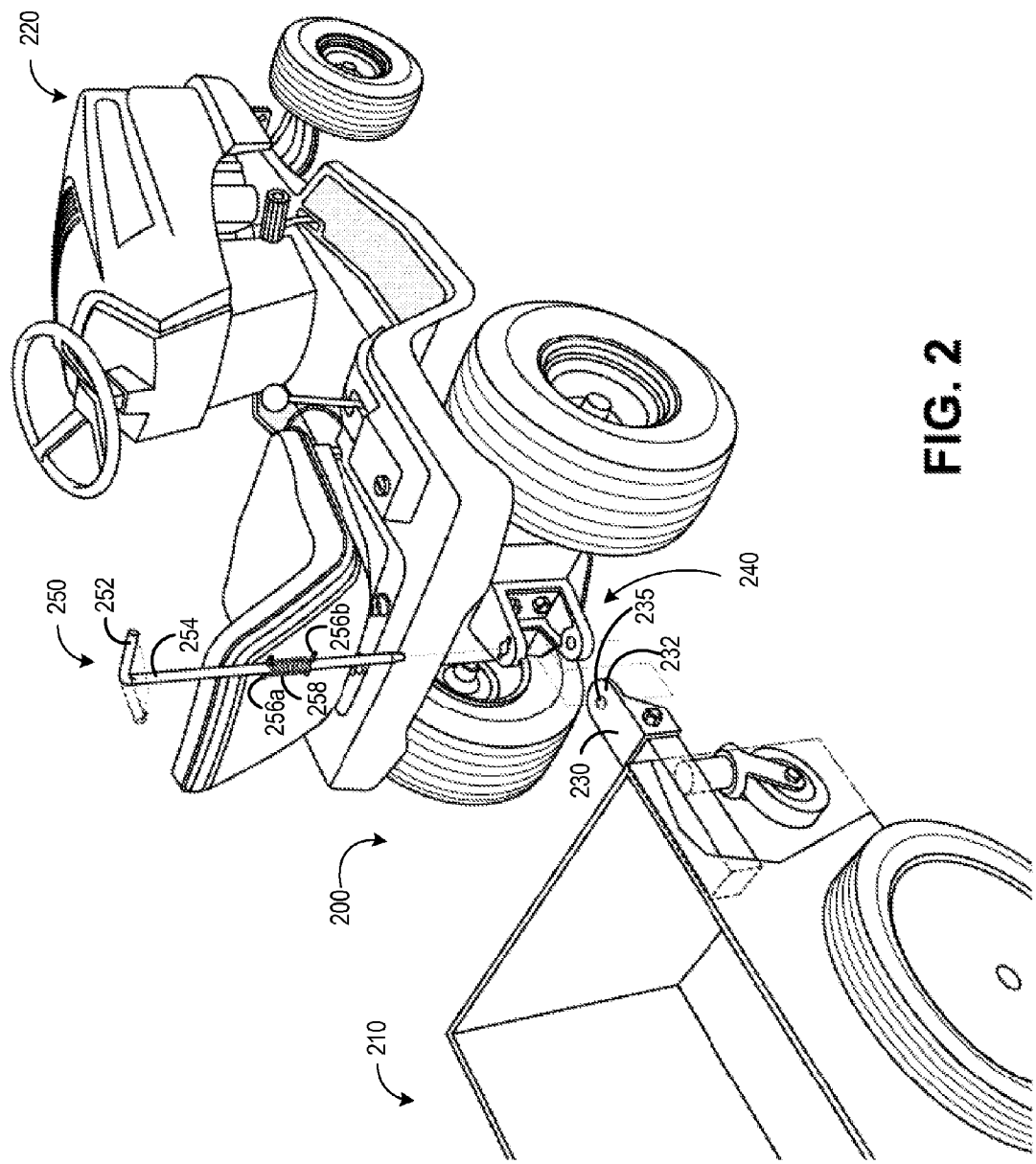
FIGS. 2-4 illustrate an example floating hitching system according to the principles of the present disclosure for attaching either a front-wheeled or standard conveyance to a motor vehicle.

FIG. 2 illustrates an example floating hitching system 200 according to the principles of the present disclosure for attaching a conveyance (e.g., conveyance 210) to a motor vehicle (e.g., motor vehicle 220). The conveyance can be any existing or future developed means of transportation including powered or unpowered vehicles. The motor vehicle 220 can be any motorized vehicle such as a lawn motor or any other motorized vehicle.

The hitching system 200 comprises a tongue 230 attached to a conveyance (e.g., conveyance 210), a floating hitch 240 attached to a motor vehicle (e.g., motor vehicle 220), and a compression-hitching pin 250.

The tongue 230 includes a protrusion 232 having a hole 235.

Figure 3:
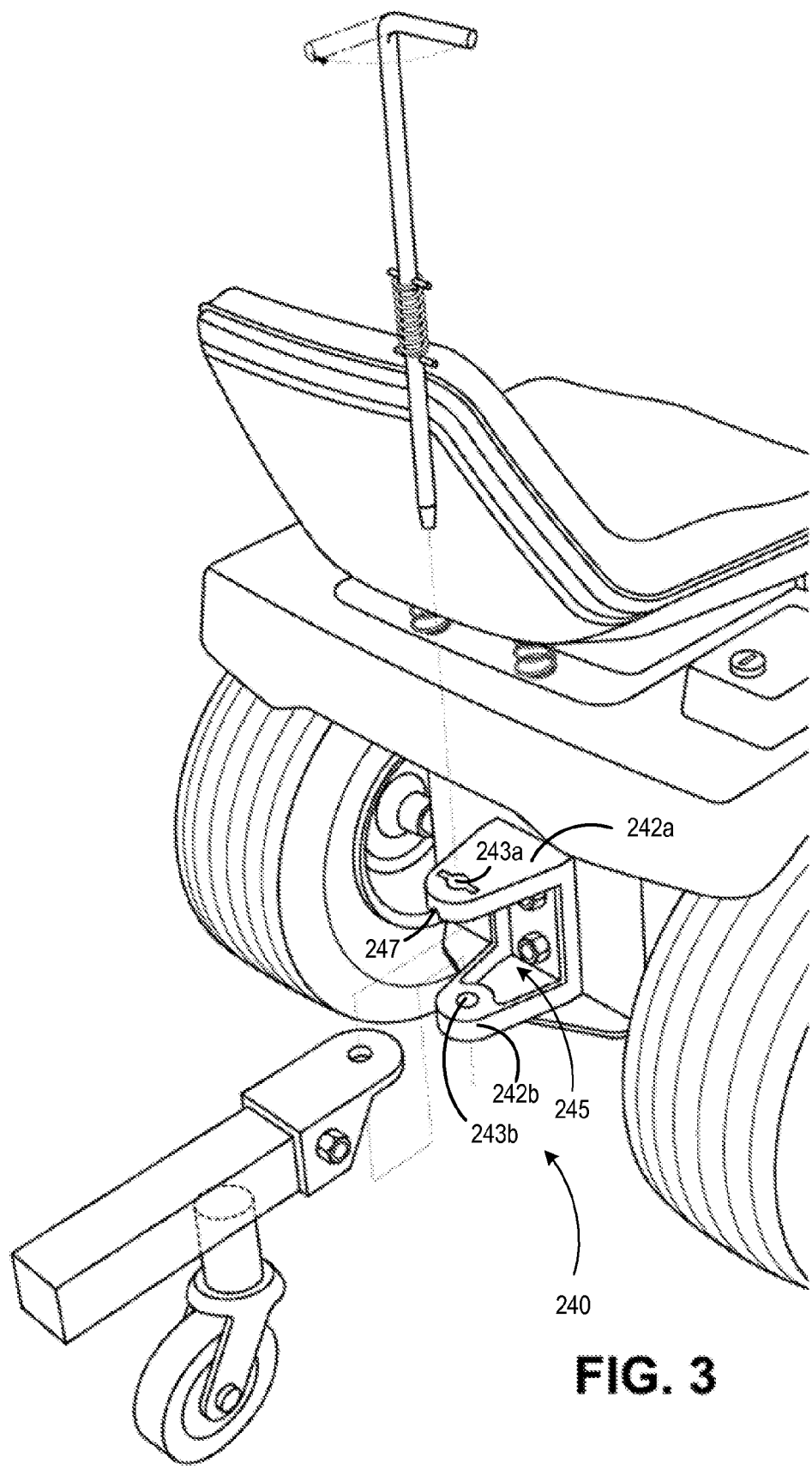

Referring to FIG. 3, the floating hitch 240 includes a top portion 242a having a hole 243a, a bottom portion 242b having a hole 243b, and an opening 245 between the top portion 242a and the bottom portion 242b. In some implementations, the opening 245 can have a height of up to twelve inches. In some implementations, the opening 245 can have a height greater than twelve inches. In some implementations, the height of the opening 245 can be less than 8 inches. In some implementations, the height of the opening can be based on the size of a wheel of the conveyance.

Returning to FIG. 2, the hitching pin 250 includes a handle 252, a shaft 254, a first pin 256a (e.g. a dowel pin), a second pin 256b (e.g. a dowel pin), and a compression spring 258. The shaft 254 includes a first hole and a second hole positioned at a first and second position to receive the first pin 256a and second pin 256b, respectively. The first pin 256a and the second pin 256b are of a sufficient length such that the ends of the pins extend from the shaft 254. The compression spring 258 is inserted around the hitching pin 250 between the first pin 256a and second pin 256b.

To hitch a conveyance to a motor vehicle using the floating hitching system 200, the tongue 230 is positioned between the top portion 242a and the bottom portion 242b of the floating hitch 240 (i.e., the tongue 230 is positioned in the opening 245 of the floating hitch 240) and the holes 235 and 243b are aligned. Because the opening 245 of the floating hitch 240 can be much larger than the opening 135 of the trailer tongue 130, positioning the tongue 230 in the opening 245 of the floating hitch 240 can be easier than positioning the tow bar 140 in the opening 135 of the trailer tongue 130 of the existing hitching system 100.

Once the tongue 230 and the floating hitch 240 are aligned, the hitching pin 250 is inserted through the floating hitch 240 and the tongue 230 and locked in place by pushing down on the handle 252 of the hitching pin 250 and then turning the handle 252.

More specifically, and referring to FIGS. 2 and 3 as applicable, the lower portion of the shaft 254 and the second pin 256b of the hitching pin 250 are inserted through the hole 243a of the top portion 242a of the floating hitch 240. The hole 243a is configured to receive the lower portion of the shaft 254 and the second pin 256b when the second pin 256b is in a first direction lengthwise. The compression spring 258 is of a sufficient diameter such that the compression spring 258 is blocked by the top portion 242a of the floating hitch 240. When the bottom of the compression spring 258 rests on the top portion 242a of the floating hitch 240, the lower portion of the shaft 254 is of a sufficient length such that the end of the shaft 254 can be received by the holes 235 and 243b.

As the handle 252 of the hitching pin 250 is pushed down, the compression spring 258 is compressed, and then the handle 252 of the hitching pin 250 is rotated to position the second pin 256b in a second direction lengthwise to align the second pin 256b with a slot 247 to receive both ends of the second pin 256b. In some implementations, the handle 252 is rotated 90 degrees from the first direction (that is, the first direction and the second direction are at right angles).

Figure 4:
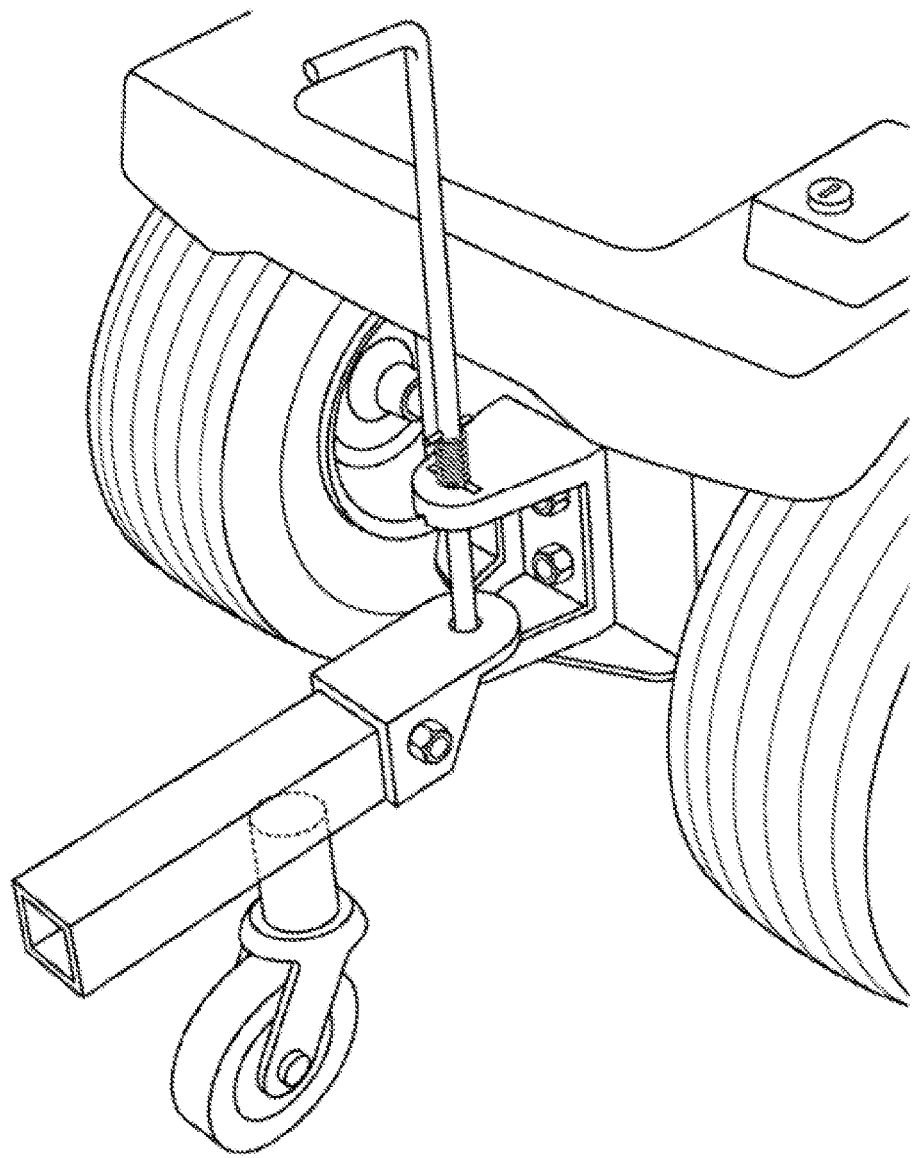

Once the second pin 256b is aligned with the slot 247, the handle 252 is released so that both ends of the second pin 256b can be received by the slot 247 thereby both hitching the conveyance to the motor vehicle and securing the hitching pin in place, as shown in FIG. 4.

To un-hitch a conveyance from a motor vehicle, the handle 252 of the hitching pin 250 is pushed down and rotated to position the second pin 256b back in the first direction lengthwise so that the second pin 256b may be passed back through the hole 243a. Thereafter, the hitching pin 250 can be removed from the tongue 230 and the floating hitch 240.

By using the floating hitching system 200, an operator can hitch (and un-hitch) a conveyance to a motor vehicle with relative ease and speed. The operator is not required to bend down as far to insert and lock the hitching pin 250 as the operator would have to bend to insert the hitching pin 150 and the locking pin 160 of the standard hitching system 100. Furthermore, since the operator can press down on the handle 252 from a standing position, the operator's weight can help compress the spring during the hitching and un-hitching operations. Thus, the floating hitching system 200 may be used more easily by operators with physical impairments than the standard hitching system 100.

Furthermore, the tasks involved in hitching a conveyance to a motor vehicle using the floating hitching system 200 require less coordination, flexibility, and eyesight than coordination, flexibility, and eyesight required to perform the tasks involved in hitching a trailer to a motor vehicle using the standard hitching system 100.

Figure 5A:
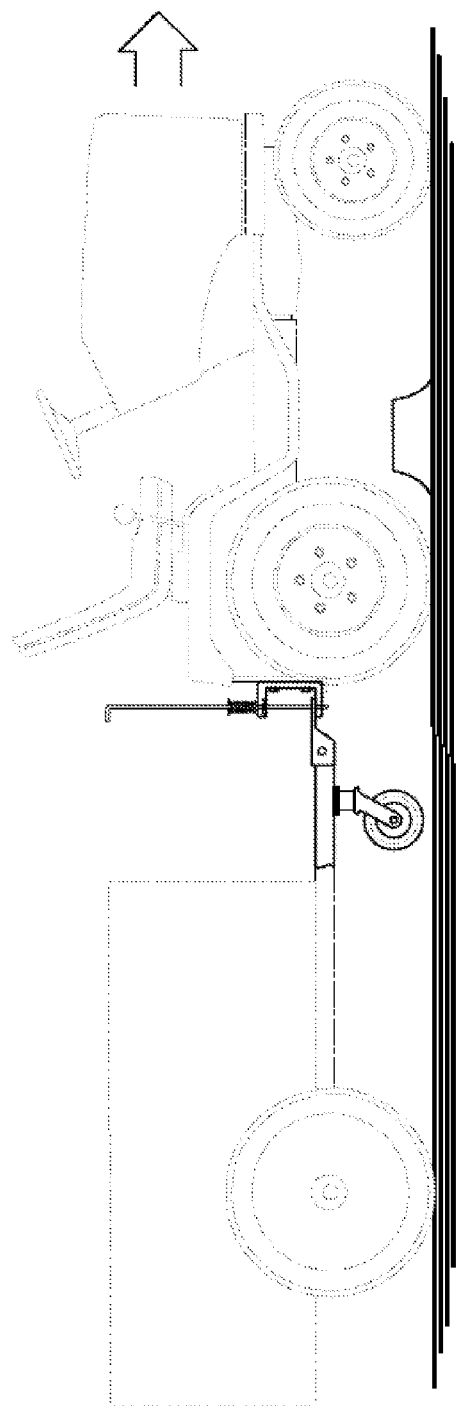
FIG. 5 illustrates the floating functionality of the example floating hitching system of FIG. 2.
Figure 5B:
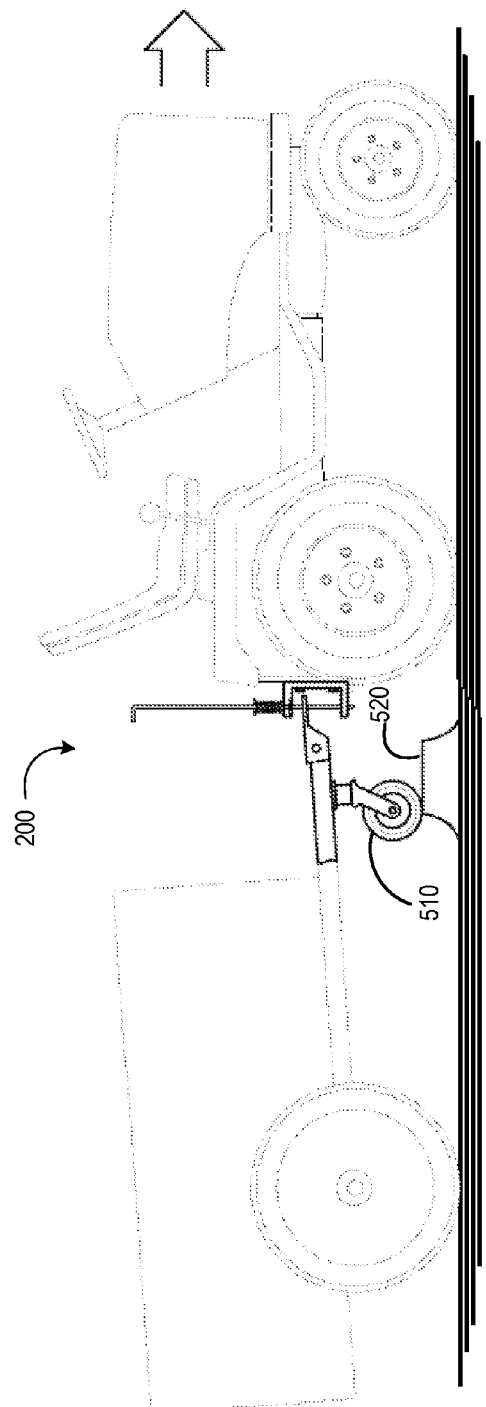

Still further, the floating hitching system 200 provides more vertical motion for the front-end of a conveyance than the vertical motion provided for the front-end of a trailer by the standard hitching system 100. That is, as shown in FIGS. 5A and 5B, the tongue 230 can move (or float) along the shaft 254 of the hitching pin 250 when the conveyance encounters an elevation such as rough terrain. The floating hitching system 200 may prevent a front wheel 510 of the conveyance from being damaged as the conveyance attempts to travel over an elevation 520. With a standard hitching system 100, the front wheel 510 may be damaged since the standard hitching system has limited vertical motion.

Reference throughout this specification to "an embodiment" or "implementation" or words of similar import means that a particular described feature, structure, or characteristic is included in at least one embodiment of the present invention. Thus, the phrase "in an embodiment" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

The invention claimed is:

1. A floating hitch system comprising:
   a tongue including a protrusion having a hole;
   the floating hitch including a top portion having a hole and a slot, a bottom portion having a hole, and an opening between the top portion and the bottom portion; and
   a compression-hitching pin including a handle, a shaft, a first pin inserted through the shaft of the hitching pin at a first location, a second pin inserted through the shaft of the hitching pin at a second location, and a compression spring located around the shaft between the first pin and the second pin,
   wherein the ends of the first pin and the second pin extend from the shaft;
   wherein the hole of the top portion of the floating hitch is configured to receive the lower portion of the shaft and the second pin of the hitching pin when the second pin is in a first direction; and
   wherein the compression spring is of a sufficient diameter so that the top portion of the floating hitch blocks the compression spring from being inserted in the hole of the top portion.

2. The floating hitch system of claim 1 wherein the opening between the top portion and the bottom portion of the floating hitch is at least 6 inches in height.

3. A method to hitch a conveyance to a motor vehicle using the floating hitch system of claim 1, the method comprising:
   aligning and the hole of the tongue with the hole of the bottom portion;
   inserting the lower portion of the shaft and the second pin of the hitching pin through the hole of the top portion of the floating hitch;
   pressing down on the handle of the hitching pin thereby compressing the compression spring;
   rotating the handle to align the second pin of the hitching with the slot of the top portion; and
   releasing the handle of the hitching pin to engage the second pin of the hitching with the slot of the top portion.

4. The method of claim 3 wherein the handle is rotated by ninety degrees.

5. The method of claim 3 further comprising unhitching the conveyance from the motor vehicle wherein unhitching comprises:
   pressing down on the handle of the hitching pin thereby compressing the compression spring;
   rotating the handle to position the second pin in the first direction; and
   releasing the handle of the hitching pin so that the second pin can pass back through the hole of the top portion.

6. A floating hitching system comprising:
   a tongue attached to a conveyance wherein the tongue includes a protrusion having a hole;

a floating hitch attached to a motor vehicle wherein the floating hitch includes a top portion having a hole and a slot, a bottom portion having a hole, and an opening between the top portion and the bottom portion; and a hitching pin including a handle, a shaft, a first pin inserted through the shaft of the hitching pin at a first location, a second pin inserted through the shaft of the hitching pin at a second location, and a compression spring located around the shaft between the first pin and the second pin, wherein the ends of the first pin and the second pin extend from the shaft;

wherein the lower portion of the shaft and the second pin of the hitching pin are inserted through the hole of the top portion of the floating hitch and the lower portion of the shaft is inserted through the hole of the tongue and the hole of the bottom portion of the floating hitch; and the bottom of the compression spring is compressed against the top portion of the floating hitch while the second pin is engaged with the slot of the top portion.

7. The floating hitching of claim 6 wherein a conveyance includes at least one front wheel.

\* \* \* \* \*